Nov. 5, 1963 E. S. NYITRAI 3,109,242
WORK-LOCATING MEANS FOR MACHINE TOOL WORK HOLDERS
Filed Oct. 22, 1959 4 Sheets-Sheet 4
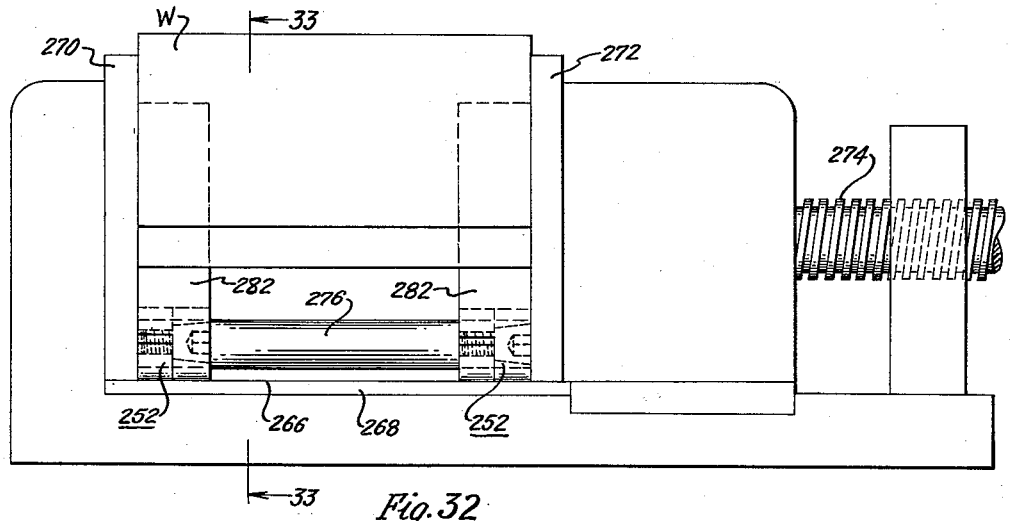
Fig. 32
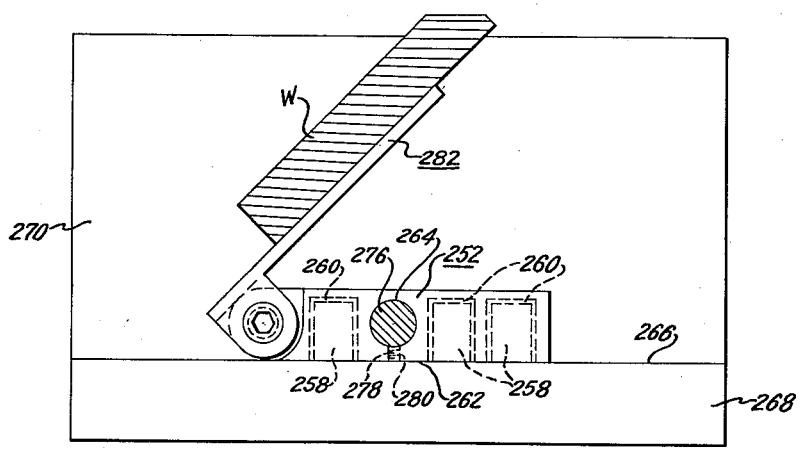
Fig. 33
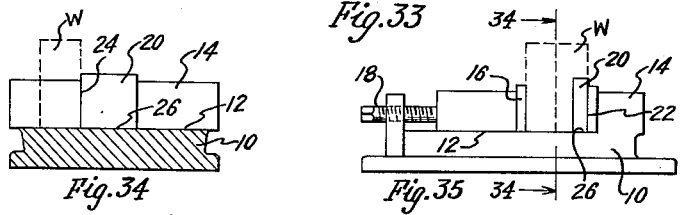
Fig. 34    Fig. 35
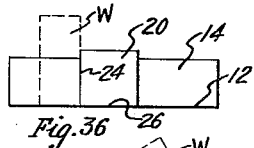
Fig. 36
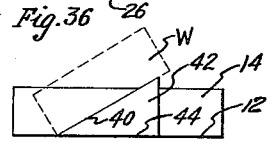
Fig. 39
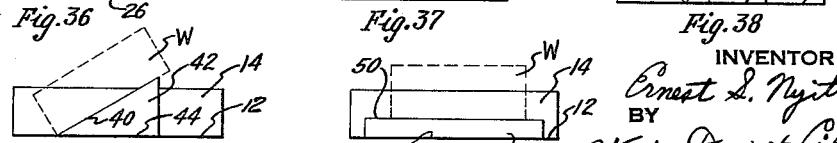
Fig. 37    Fig. 38
Fig. 40
INVENTOR
Ernest S. Nyitrai
BY
Wooster, Davis + Cifelli
ATTORNEYS

United States Patent Office 3,109,242
Patented Nov. 5, 1963

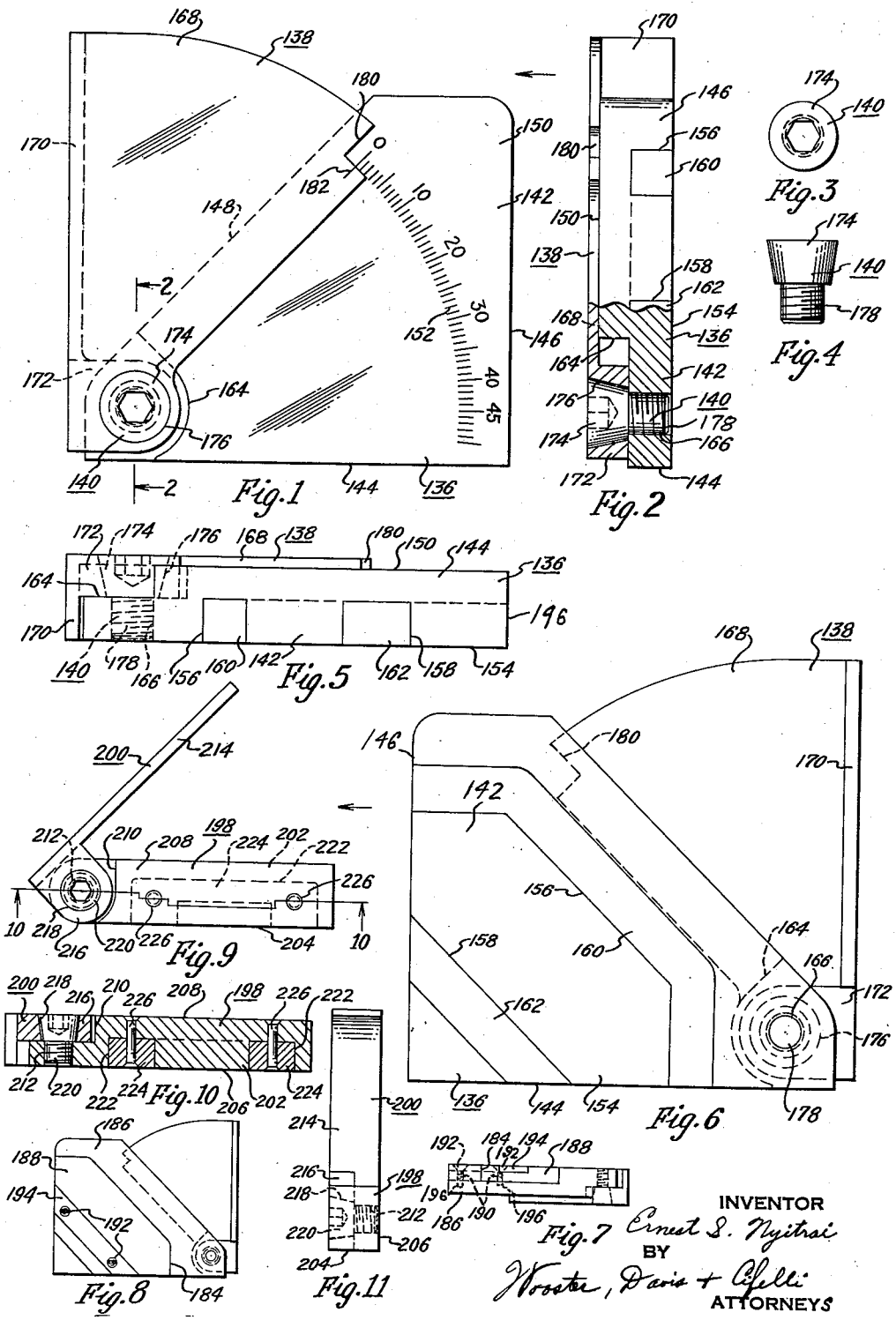

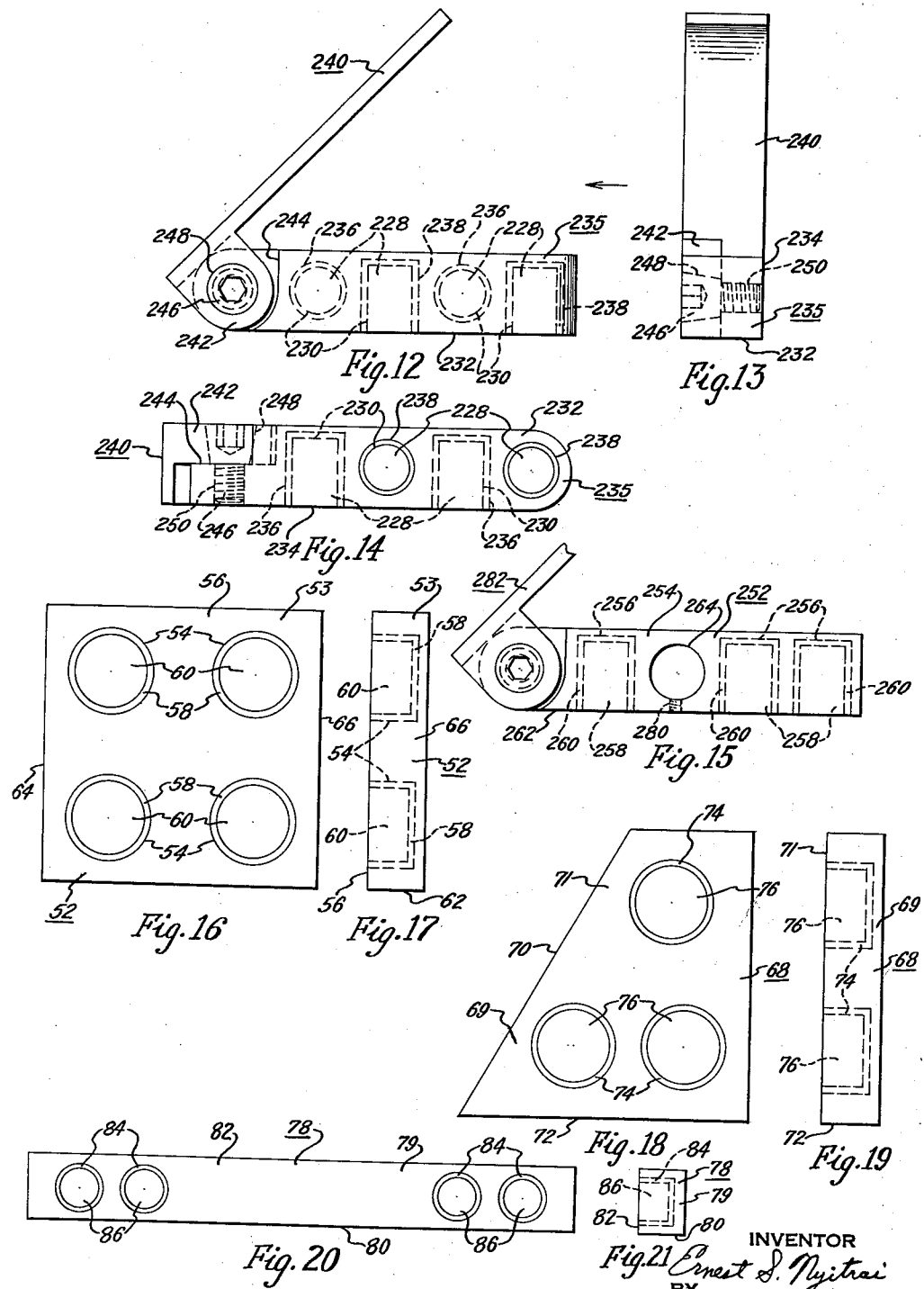

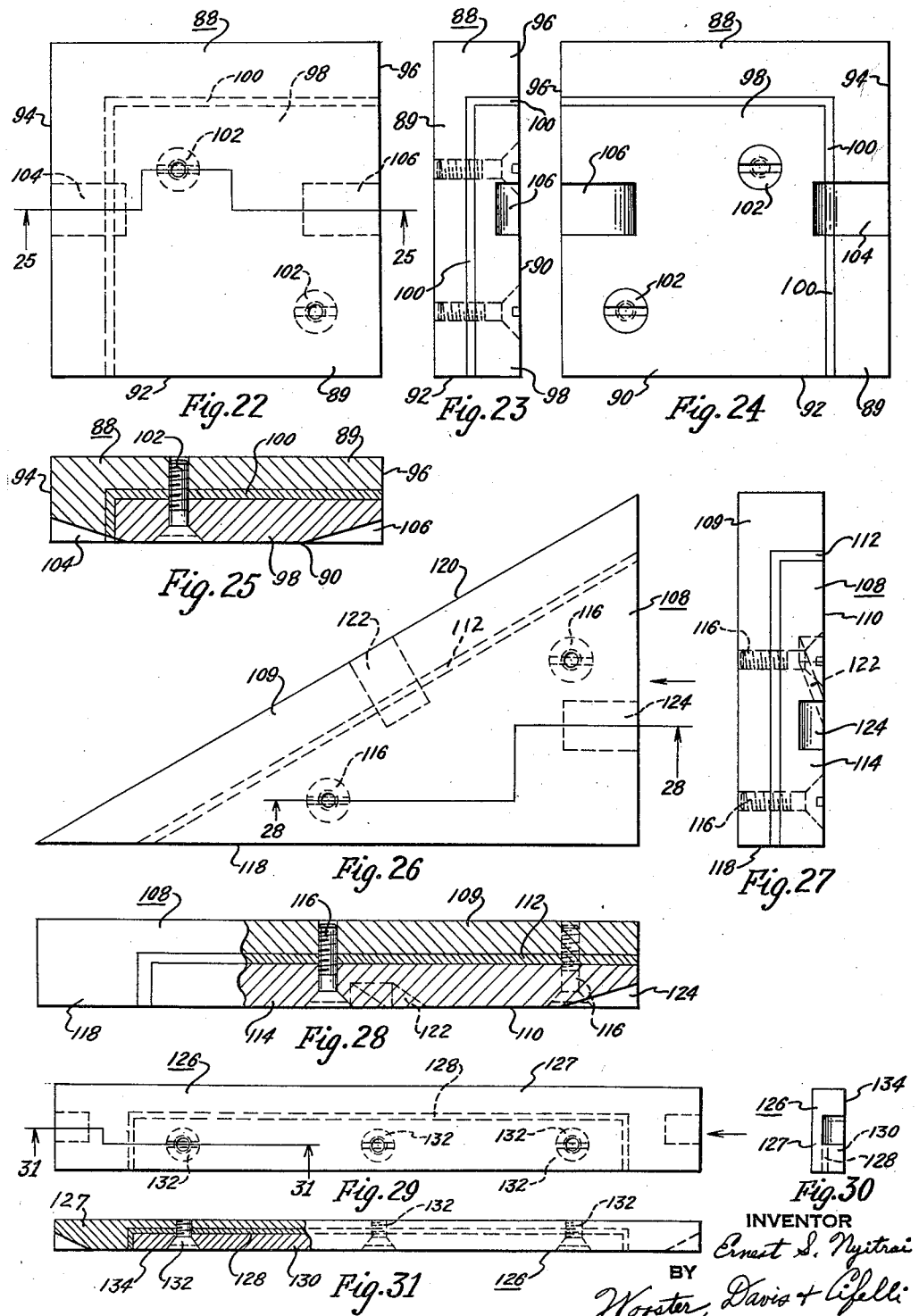

3,109,242
WORK-LOCATING MEANS FOR MACHINE TOOL
WORK HOLDERS
Ernest S. Nyitrai, 127 Lockwood Ave., Stamford, Conn.
Filed Oct. 22, 1959, Ser. No. 848,058
4 Claims. (Cl. 33—174)

This invention relates generally to work holders, such as vises which form a part of machine tools and function to hold work during machining thereof, and particularly to work-locating means which are used in association with such work holders and function to locate work in such work holders.

During the machining of work on machine tools, for example when such work is performed by tool makers, it is desirable that pieces of work, such as blanks from which tools are being made, be held securely in the work holder of the machine tool and be properly positioned therein. During such machining, the tool maker may desire to remove the work from the work holder and then replace it therein, either in the same or a different predetermined position relative to the work holder. Also, during machining certain pieces of work, it is desirable that a plurality of such pieces be individually held in the work holder serially, i.e. one after the other, in the same position relative to the work holder. Furthermore, in performing all machining operations it is very important that the position of the work in the work holder be accurately determined. To the knowledge of applicant, the machine tool and tool-making arts have not provided machine tools having work holders with work-locating means which are capable of satisfying this long-felt need in these arts.

It is an object of the invention to provide work-locating means to be utilized with the work holder of machine tools and which functions to properly position pieces of work that are mounted therein.

It is another object of the invention to provide work-locating means as set forth in the preceding paragraph, wherein such means is separate from the work holder and readily attachable thereto and detachable therefrom.

It is still another object of the invention to provide one form of work-locating means as set forth in either of the preceding paragraphs, which includes an angularly adjustable work-locating surface, whereby in this form of work-locating means the work-locating surface may be selectively adjusted to any desired angular position.

It is a further object of the invention to provide another form of work-locating means as set forth in the preceding paragraph, which includes angle measurement and indicating means integrally incorporated therein, whereby the adjustable work-locating surface may be selectively disposed in any desired angular disposition without utilizing auxiliary angle measurement means, such as a protractor.

It is a subsidary object of the invention to provide an improved protractor which is particularly useful to machinists and tool makers.

The above and other objects and further details of that which I believe to be novel and my invention will be clear from the following description and claims taken with the accompanying drawings, wherein:

FIG. 1 is a front elevational view of the preferred form of the invention;

FIG. 2 is a partial side elevational view thereof looking in the direction of the arrow in FIG. 1 and a partial sectional view taken substantially on line 2—2 of FIG. 1;

FIGS. 3 and 4 are, respectively, a top plan view and a side elevational view of an adjusting screw which forms a part thereof;

FIG. 5 is a bottom plan view thereof;

FIG. 6 is a rear elevational view thereof;

FIG. 7 is a bottom plan view of a modification thereof;

FIG. 8 is a rear elevational view of the FIG. 7 modification;

FIG. 9 is a front elevational view of another form of the invention;

FIG. 10 is a sectional view taken substantially on line 10—10 of FIG. 9;

FIG. 11 is a side elevational view thereof looking in the direction of the arrow in FIG. 9;

FIG. 12 is a front elevational view of another form of the invention;

FIG. 13 is a side elevational view thereof looking in the direction of the arrow in FIG. 12;

FIG. 14 is a bottom plan view thereof;

FIG. 15 is a side elevational view of a modification of the FIGS. 12–14 form of the invention;

FIGS. 16 and 17, are respectively a rear elevational view and a side elevational view of another form of the invention;

FIGS. 18 and 19 are, respectively, a rear elevational view and a side elevational view of another form of the invention;

FIGS. 20 and 21 are, respectively, a rear elevational view and a side elevational view of another form of the invention;

FIGS. 22, 23 and 24, are, respectively, a front elevational view, a side elevational view, and a rear elevational view of another form of the invention;

FIG. 25 is a sectional view taken substantially on line 25—25 of FIG. 22;

FIG. 26 is a front elevational view of another form of the invention;

FIG. 27 is a side elevational view thereof looking in the direction of the arrow in FIG. 26;

FIG. 28 is a partial bottom plan view thereof and a partial sectional view taken substantially on line 28—28 of FIG. 26;

FIG. 29 is a front elevational view of another form of the invention;

FIG. 30 is a side elevational view thereof looking in the direction of the arrow in FIG. 29;

FIG. 31 is a partial bottom plan view thereof and a partial sectional view taken substantially on line 31—31 of FIG. 29;

FIG. 32 is a front elevational view of a machine tool work holder showing a pair of the FIG. 15 type of locating means operatively associated therewith to position a piece of work;

FIG. 33 is a sectional view taken substantially on line 33—33 of FIG. 32;

FIG. 34 is a sectional view taken substantially on line 34—34 of FIG. 35;

FIG. 35 is a front elevational view of a machine tool work holder showing a piece of work positioned therein by one type of locating block;

FIG. 36 is a schematic view of the FIGS. 34 and 35 structural relationship;

FIG. 37 is a schematic view similar to FIG. 36 which shows a different type of locating block;

FIG. 38 is a schematic view similar to FIG. 36 which shows another type of locating block;

FIG. 39 is a schematic view similar to FIG. 36 which shows another type of locating block, and FIG. 40 is a schematic view similar to FIG. 36 which shows another type of locating block.

In the drawings, a number of different forms of the invention are illustrated and will be described in detail. All of the illustrated forms, however, are predicated upon the same inventive concept of providing work-locating means for machine tool work holders which are separate therefrom and are temporarily operatively associated therewith and held thereto by magnetic means, and which function to laterally position a piece of work held in the work holder. Machine tool work holders with which the work-locating means contemplated by the invention are utilized, normally are in the form of a steel vise comprising a relatively stationary jaw and a relatively movable jaw for clamping work, and a work table for supporting work between the jaws. The vise usually includes means for selectively moving the jaws relatively either toward or away from each other to either grip or release a piece of work which is placed therebetween on the work table. In all illustrated forms of the invention, the thickness of the work-locating means is less than the minimum tolerance of the thickness of the work. For the purposes of facilitating an understanding of the invention, certain directional references will be made throughout the detailed description of each illustrated form of the invention, and the meaning of such directional references will be explained in advance and applies to all illustrated forms. The direction of movement of the work holder jaws toward or away from each other will be considered to be the "longitudinal" direction. Movement of the work in any direction normal to the longitudinal direction will be considered to be movement in the "lateral" direction. The dimensional relationship set forth above between the thicknesses of the work-locating means and the work is intended to be the thicknesses thereof in the longitudinal direction. Therefore, the work-locating means is not compressed between the work holder jaws, for the thickness of the work prevents this. Work-locating means contemplated by all illustrated forms of this invention are utilized to laterally position a piece of work in a work holder and include magnetic means which is operative at one side of the work-locating means and which is placed in contact with a work holder jaw for temporarily attaching the work-locating means to the work holder jaw. When so attached, the work-locating means is disposed laterally of the work and neither it nor its magnetic means in any way functions to retain the work in the work holder; it functions solely to laterally position the work. Therefore, my invention should not be confused with vise jaw plates or covers which are magnetically held to the jaws of a vise, particularly a bench vise, and function to contact and hold a piece of work.

In all illustrated forms of work-locating means, magnetic means is incorporated which functions solely to attach the work-locating means to the work holder, usually a jaw thereof. The magnetic means is preferably in the form of one or more permanent magnets, although it is possible to utilize a material that is temporarily magnetized by an electro-magnetic coil. The preferred permanent magnets may be of the aluminum-nickel-cobalt type or any other magnetic alloy.

Reference to FIGS. 34–40 will quickly convey an understanding of the general manner in which all illustrated forms of the invention operate when associated with a machine tool work holder to locate a piece of work therein. The particular type of machine tool is not critical, and it may vary and be, for example, a grinder, miller, drill press or the like. However, regardless of the particular type of machine tool involved, the invention is particularly useful with a machine tool work holder which normally is an integral part of the machine tool, rather than a conventional bench vise. In FIGS. 34 and 35 there is illustrated a machine tool work holder which includes a work table 10 having a flat upper horizontal surface 12 on which a piece of work W in the form of a blank may be supported, a relatively stationary jaw 14, a relatively movable jaw 16, and conventional, selectively operated mechanism 18 for moving the movable jaw 16 either toward or away from the stationary jaw 14 to either grip or release the piece of work W. Work-locating means in the form of a locating block 20 is operatively associated with the stationary jaw 14 so as to laterally position the piece of work W. The locating block 20 is illustrated as being generally square in outline, as viewed in FIG. 34, and generally rectangular in outline as viewed in FIG. 35. The locating block 20 includes magnetic means which is operative solely so as to cause the side 22 thereof to firmly adhere to the face of stationary jaw 14. In this connection it should be noted from FIG. 35 that the longitudinal thickness of the locating block 20 is less than the longitudinal thickness of the piece of work W, and therefore, the movable jaw 16 does not contact the locating block 20. The particular relative disposition of the locating block 20 and the face of stationary jaw 14 may be selectively determined by the operator moving the locating block to any desired position on the face. In the FIGS. 34 and 35 illustration, a lateral side of the piece of work W contacts a lateral edge wall 24 of the locating block 20 and is positioned thereby so as to extend at an angle of 90° to the work table surface 12. The bottom edge wall 26 of the locating block 20 rests on the work table surface 12 and may be forceably slid relative thereto and relative to the stationary jaw face so as to position the piece of work W in any desired lateral horizontal position. After properly positioning the locating block 20 laterally horizontally relative to the work table surface 12 and the face of the stationary jaw 14, the piece of work W is placed on the work table surface 12 and moved into position wherein one of its longitudinal sides contacts the face of stationary jaw 14 and one of its lateral sides contacts the edge wall 24 of the locating block. Thereafter, the movable jaw moving mechanism 18 is actuated so as to advance the movable jaw 16 toward the stationary jaw 14 and ultimately clamp the piece of work W in the tool holder preparatory to having a machine operation performed thereon. The dispositional relationship of the work table surface 12, the face of movable jaw 14, locating block 20 and piece of work W is schematically illustrated in FIG. 36.

If it is desired to incline the piece of work W laterally angularly relative to the work holder, locating blocks having any desired angular inclination of their work contacting edge walls may be utilized. It should be understood that in all other respects they are generally similar to locating block 20. In FIG. 37 there is schematically illustrated a piece of work W which is laterally positioned by locating block 28 so as to be laterally inclined toward the operator at an angle of 30° from the vertical. In order to effect this disposition of the work W, the work-contacting edge wall 30 of locating block 28 is inclined at an angle of 60° from the bottom edge wall 32 thereof, which rests on work table surface 12.

In FIG. 38 a piece of work W is schematically illustrated as inclined at an angle of 45° from the vertical toward the operator, and this angular disposition of the work W is effected by the inclined work-contacting edge wall 34 of the locating block 36 which has a bottom edge wall 38 that rests on work table surface 12.

In FIG. 39 there is illustrated schematically a piece of work W inclined laterally toward the operator at an angle of 60° from the vertical, and this angular disposition of work W is effected by the appropriately inclined work-contacting edge wall 40 of the locating block 42 which also includes a bottom edge wall 44 that rests on work table surface 12.

FIG. 40 schematically illustrates a locating block 46 having a bottom edge wall 48 which rests on the work table surface 12 and a top edge wall 50 which is arranged to contact the lower side of a piece of work W and function to position it laterally vertically, that is, space it above the work table surface 12.

It will, therefore, be understood from a review of FIGS. 34–40 that, in general, all of the illustrated forms of the invention may be utilized to position a piece of work W laterally in a work holder. In laterally positioning a piece of work, the piece of work may be displaced laterally horizontally, inclined laterally at any desired angle relative to the work table surface, either toward or away from the operator, or be laterally vertically spaced above the work table surface. All of the locating blocks illustrated in FIGS. 34–40 include magnetic means which is operative on one side of the blocks so as to cooperate with a tool holder jaw, which is made of a magnetic material such as steel, and adhere thereto in any desired position. The details of construction of the magnetic means will be set forth subsequently. To achieve simple lateral horizontal positioning, all of the FIG. 32 blocks include a flat bottom edge wall which preferably rests on the work table surface and thereby functions as a reliable reference plane from which lateral angular inclinations or lateral vertical spacing may be measured. In practice, it is intended that a set of locating blocks of various types, that is, locating blocks having various work-contacting edge wall inclinations, such as the representative ones illustrated in FIGS. 34–39, and locating blocks of the type illustrated in FIG. 40 having varying heights, will be provided in order that various lateral positioning of work in a work holder may be quickly and efficiently effected.

In describing the general operation of the locating blocks illustrated in FIGS. 37–40, it has been generally disclosed that the blocks include magnetic means which is operative on one side thereof to cause the blocks to firmly adhere to a work-holder jaw. The particular construction of the magnetic means may vary, and in the drawings several forms of locating blocks are illustrated which include different types of magnetic means.

In FIGS. 16 and 17, there is illustrated a locating block 52 which comprises a body 53 which is generally square in outline and which may be made of a magnetic material, such as steel. A plurality of circular cavities 54 which open to one side 56 of the body are formed in the body. In each cavity 54 there is press-fitted a cup-like insert liner 58, which is made of a nonmagnetic material, such as copper or the equivalent. Within each insert liner 58 there is press-fitted a magnet insert 60 which may be made of any suitable permanent magnet material, such as magnet steel or a magnet alloy, as the aluminum-nickel-cobalt type. The insert liners 58 and the magnet inserts 60 are dimensioned so as to be rigidly mounted in the block body 53. The bottom edge wall 62 of the block body 53 may be disposed on a work table surface of a machine tool work holder, and the side 56 thereof may be disposed contiguous with the face of a tool holder jaw. The arrangement of the magnet inserts 60 is such that the cup-like insert liners 58 function to shield the block body 53 from the field of the magnet inserts, and thereby function to concentrate magnetic lines of flux on the side 56 of the block body 53. Therefore, the locating block 52 may be detachably, but firmly, secured to a work holder jaw by having the block body side 56 disposed contiguous with the jaw face. When the block 52 is operatively associated with the machine tool work holder, its bottom wall 62 preferably rests on a work table surface and the edge walls 64 and 66 of the block body 53 may be utilized as work-contacting walls which laterally horizontally position a piece of work in the work holder.

FIGS. 18 and 19 disclose a representative locating block 68 which is constructed and utilized in generally the same manner as the block 52 of FIGS. 16 and 17, except that its body 69 has an inclined work-contacting edge wall 70 which is angularly disposed relative to the bottom edge wall 72 of body 69 at an angle of 60°, and therefore may function to laterally position a piece of work at an angle of 30° from the vertical. The block body 69 may be made of steel and includes a work holder jaw contacting side 71, cup-like insert liners 74 and magnet inserts 76, all of which are generally similar in construction and material to their counterparts in locating block 52. It should be understood that any desired angular disposition of the edge wall 70 may be provided.

In FIGS. 20 and 21 there is illustrated a locating block 78 comprising a body 79, which may be made of steel, having a bottom edge wall 80 and a work holder jaw-contacting side 82 which may be utilized to vertically space a piece of work above a work holder surface. The locating block 78 includes cup-like insert liners 84 and magnet inserts 86 which are mounted in its body 79 and are generally similar in construction and material to their counterparts in locating blocks 52 and 68. The locating block 78 is magnetically secured to a work holder jaw in substantially the same manner as the locating blocks 52 and 68.

In describing the locating blocks 52, 68 and 78, the block bodies have been described as being made of steel, which is a magnetic material, and the magnet inserts have been disclosed as being shielded by non-magnetic insert liners. It should be understood that if desired, the insert liners may be eliminated, and the locating block bodies may be made of a non-magnetic material and the magnet inserts mounted directly in the bodies. No finite dimensions have been set forth with regard to locating blocks 52, 68 and 78; it should be realized, however, that any suitable dimensions may be utilized. Also, it should be realized that the size, number and disposition of the magnet inserts may be varied to achieve the desired magnetic attraction. Solely for the purposes of exemplification, an effective dimensional relationship is for the blocks to be approximately ½" thick and their maximum width and height to be in the range of 1½" to 3". These dimensions, however, may be varied without departing from the spirit of the invention. In the case of the locating block 78, it is intended that the height vary, as by falling in the range of ¾" to 2", and that the length vary as desired.

In FIGS. 22–25, there is illustrated a locating block 88 which is generally similar to locating block 52 except that it has a different type of magnetic means incorporated therein and means to facilitate prying the locating block 88 off of a work holder jaw. The locating block 88 comprises a body 89 made of a magnetic material such as steel, and includes a work holder jaw-contacting side 90, a bottom edge wall 92, and work-contacting edge walls 94 and 96. The locating block 88 includes magnetic means in the form of a generally plate-like, square, solid magnet insert 98 that is rigidly secured to the body 89 and magnetically insulated therefrom by a square, pan-like insert liner 100 made of a non-magnetic material such as copper. The magnet insert 98 and insert liner 100 are rigidly secured to the body 89 in a square recess by screws 102 which are made of a nonmagnetic material such as copper. The locating block 88 may be temporarily magnetically secured to the face of a work holder jaw by having its side 90 placed in contact with the jaw face after its bottom wall 92 has been placed on a work table surface. In the work holder jaw contacting side 90, a pair of spaced cut-away recesses 104 and 106 are formed, and these may be utilized in prying off locating block 88 from a work holder jaw by inserting the tip of an implement, such as a screw driver, and forcing the locating block 88 away from the work holder jaw to overcome the magnetic attraction and remove the locating block from the jaw. It will be noted particularly from FIG. 24 that the cut-away recess 106 is formed entirely in the magnetic insert 98, and that the cut-away recess 104 is formed partially in the magnet insert 98, the insert liner 100 and the locating block body 89.

In FIGS. 26–28, there is illustrated a locating block which is generally similar to the locating block 88, except that it is designed to laterally position a piece of work so as to incline toward the operator at an angle of 60° from the vertical. The locating block 108 in FIGS. 26–28 comprises a body 109 which is generally triangular in outline, made of a magnetic material such as steel, and has a work holder jaw-contacting side 110. The locating block body 109 has a generally triangular recess in which is mounted a pan-like insert liner 112 made of a nonmagnetic material such as copper, and a plate-like magnet insert 114. The insert liner and magnet insert are rigidly secured to the body 109 by a plurality of screws 116 which are made of a nonmagnetic material such as copper. The locating block 108 has a flat bottom edge wall 118 and an inclined work-contacting edge wall 120. The locating block may be magnetically secured to a work holder jaw in the same manner as locating block 88. A pair of recesses 122 and 124 are formed in the side 110, and may be utilized in prying off the locating block from the work holder jaw.

In FIGS. 29-31 there is illustrated a locating block 126 which is particularly useful in spacing a piece of work vertically in a work holder. The locating block 126 comprises an elongated body 127 of a magnetic material such as steel, which is block-like, generally rectangular in outline and recessed. In the recess, the body 127 rigidly supports an elongated pan-like insert liner 128 made of a nonmagnetic material such as copper, and an elongated magnet insert 130. The insert liner and magnet insert are secured to the locating block body by a plurality of screws 132 made of a nonmagnetic material such as copper. Magnet insert 130 is exposed on the work holder jaw-contacting side 134 of the locating block body 127.

In describing the locating blocks 88, 108 and 126, the block bodies have been described as being made of a material such as steel, and the magnet inserts have been disclosed as being shielded by nonmagnetic insert liners. It should be understood that, if desired, the insert liners may be eliminated, and the locating block bodies made of a nonmagnetic material and the magnet inserts mounted directly in the bodies. Further, in describing these locating blocks, finite dimensions have not been set forth; it should be realized that any suitable dimensions may be utilized.

Thus far, all of the locating means described have been in the form of locating blocks having a bottom edge wall for contact with a work holder table surface, a work holder jaw-contacting side for contact with a work holder jaw, magnetic means which is operative at said side to cause the block to firmly adhere to a work holder jaw, and a work-contacting edge wall disposed at a predetermined angle relative to the vertical, or disposed so as to be spaced above the work holder table surface. The invention, however, also contemplates work-locating means in the form of adjustable assemblies having a work-contacting wall that is selectively adjustable to any desired angular disposition relative to the vertical.

In FIGS. 1-6, there is illustrated the preferred form of the invention, which is of the adjustable assembly type referred to in the preceding paragraph, wherein a selectively adjustable work-contacting wall is included. The preferred FIGS. 1-6 form of the invention also includes angle measurements and indicating means that is incorporated therein.

In FIGS. 1-6 there is illustrated the preferred form of work-locating means which is in the form of an adjustable assembly that generally comprises a base 136 which is constructed and arranged to temporarily anchor the assembly to a work holder, and a member 138 which includes a work-contacting surface and is angularly adjustably secured to the base 136 by a tapered socket head screw 140, which is illustrated by itself in FIGS. 3 and 4.

The base 136 comprises a block-like body 142 which is irregularly shaped in general outline and has a bottom edge wall 144, an edge wall 146 which is perpendicular thereto, and an inclined edge wall 148. The base body 142 includes a front side wall 150 on which a protractor-like scale 152 is inscribed. The rear side wall 154 of the base body 142 is a work holder jaw-contacting surface. The base body 142 is made of a nonmagnetic material, such as a metal alloy or the like, and includes a pair of spaced elongated recesses 156, 158 that open at the rear side wall thereof in which are mounted elongated bar-like magnet inserts 160, 162, respectively. At one corner of the front side wall 150 of the base body 142 there is formed a cut-away notch 164 which is non-symmetrical and irregularly shaped but very roughly oval viewed as in FIG. 1. Extending completely through the base body 142 and communicating with the notch 164 is a threaded opening 166.

The adjustable member 138 may be made of steel or other suitable material and comprises a generally pie-shaped wall portion 168 which is thin relative to the thickness of the body base 136, a flange-like wall portion 170 that extends perpendicularly from one edge of wall portion 168, and a laterally extending mounting protuberance 172. The flange-like wall portion 170 comprises a work-contacting wall that is selectively angularly adjustable relative to the base 136. Adjustability is effected by the previously referred to screw 140 which has its tapered socket head 174 received in the plain tapered opening 176 formed in the protuberance 172 and its threaded shank 178 adjustably anchored in the threaded opening 166. The relationship of the screw 140 and openings 176 and 178 is such as to allow pivoting of the adjustable member 138 relative to the base 136 when the screw is loosened, but which locks these parts in any position when it is tightened. Therefore, the adjustable member 138 may be selectively adjusted to any angular position relative to the base 136 by loosening the screw 140 and pivoting the adjustable member 138 on the screw head 174 to the desired angular position, and then tightening the screw 140. An appropriate tool, such as a headed wrench, may be inserted into the socket of the screw head 174 to effect loosening and tightening of the screw.

In order to provide for maximum convenience, the FIGS. 1-6 work-locating means includes integrally formed means for determining and setting any desired angle of the wall portion 170. To effect this, a notch 180 is provided in one corner of the wall portion 168, and an indicating mark 182 is formed on wall portion 168 adjacent thereto and disposed so as to cooperate with the protractor-like scale 152 to enable the wall portion 170 to be adjusted to any predetermined angle, simply by aligning the indicating mark 182 with the desired angle mark on the scale 152. As illustrated in FIG. 1, the angular mark and numerical indicia which form a part of the scale 152 have been designed to indicate angular inclination of the wall portion 170 from a vertical plane. Naturally these indicia are empirically determined, and if desired, other indicia representing angular measurements from other reference planes, such as the horizontal, could be empirically determined and utilized in the scale 152.

The foregoing represents a detailed description of the construction of the preferred FIGS. 1-6 form of the invention. In operation, the FIGS. 1-6 work-locating means is bodily usable as a self-contained unit; it is placed on a work holder table surface so as to rest on its bottom edge wall 144 and have its work holder jaw-contacting side wall 154 contiguous with the work holder jaw. The magnetic lines of flux of the magnet inserts 160 and 162 are operative on the side wall 154 of the base 136, and therefore, the base 136 firmly adheres to the work holder jaw. The adjustable member 138 may then be manually adjusted so as to dispose the wall portion 170 at the desired angular inclination. To effect such adjustment, the screw 140 is loosened, the adjustable member 138 pivoted until the desired angle of inclination is reached (the indicating mark 182 and protractor-like scale 152 being utilized to determine the angle of inclination) and the screw 140 is tightened. The work is then placed between the work holder jaws so as to laterally contact wall portion 170 and thereby have its lateral inclination determined. Thereafter, the work holder jaws are closed to clamp the work in the desired position.

If desired, the magnet inserts may be omitted from the FIGS. 1-6 form of invention and the adjustable assembly utilized as a tool for measuring and indicating angles. Such a tool is generally useful in machine shop work and may be used to laterally angularly locate work in a work holder.

In FIGS. 7 and 8 there is illustrated a modification of the FIGS. 1–6 form of the invention, which differs therefrom principally in the mounting of the magnet inserts in the base.

In the FIGS. 7 and 8 modification, instead of providing a pair of magnet inserts that are directly mounted in a pair of recesses formed in the base body, a single recess 184 is formed in the base body 186, and a single magnet insert 188 is disposed therein. The magnet insert 188 is channel-shaped in cross section and is centrally apertured at 190 so as to receive nonmagnetic securing screws 192 which pass through openings in a retaining bar 194 and are anchored in threaded openings 196 in the base body 186 to thereby retain the magnet insert 188 in the base body. In all other respects, the FIGS. 7 and 8 modification is the same as the FIGS. 1–6 modification.

In FIGS. 9–11 there is illustrated another form of the invention wherein simplified work-locating means is provided which includes an adjustable member having a work-contacting wall. In this form of the invention, the work-locating means comprises a base 198 and an adjustable member 200. Base 198 comprises a body 202 which is made of a nonmagnetic material, such as a metal alloy or the like, and which includes a bottom edge wall 204 and a rear work holder jaw-contacting side wall 206. At one end of the front side wall 208 thereof a cut-away notch 210 is formed. Extending through the base body 202 and communicating with the notch 210 is a threaded opening 212.

The adjustable member 200 is made of steel or the like and comprises a flat bar 214 having a protuberance 216 integrally formed at one end thereof and extending generally normal thereto. A tapered plain opening 218 is formed in the protuberance 216, and the latter is configured so as to be conveniently received in the notch 210 in the base body. A tapered socket head screw 220 is operatively disposed in the plain opening 218 and the threaded opening 212 so as to lock the base 198 and adjustable member 200 when it is tightend relative thereto, and to permit pivoting of the adjustable member 200 relative to the base 198 when it is loosened, all in a generally similar manner to which its counterpart screw 140 in the FIGS. 1–6 form of the invention operates to permit selective angular adjustment of its adjustable member relative to its base.

In the work holder jaw-contacting side wall 206 of the base body 202 there is formed a U-shaped recess 222 into which is disposed a U-shaped magnet insert 224. As illustrated, the magnet insert 224 is retained in the base body 222 by a pair of rivets 226. If desired, the magnet insert 224 could be press-fitted into the recess 222. However, if rivets, such as rivets 226, are utilized, as illustrated, they are made of a nonmagnetic material, such as copper.

The operation of the FIGS. 9–11 form of the invention is generally the same as that of the FIGS. 1–6 form of the invention, the only significant difference being that angle measurement and indicating means is not integrally incorporated therein. Therefore, it is necessary to use auxiliary angle measurement means, such as a separate protractor, with the FIGS. 9–11 form of the invention.

In the FIGS. 1–6, FIGS. 7 and 8, and FIGS. 9–11 forms of the invention, the base bodies have been disclosed as being made of a nonmagnetic material, and the magnet inserts as being directly mounted therein. If desired, the base bodies could be made of a magnetic material, such as steel or the like, and magnetic shields in the form of insert liners made of a nonmagnetic material, such as copper or the like, be utilized to shield the magnet inserts.

In FIGS. 12–14 there is illustrated another form of the invention which is generally similar to the FIGS. 9–11 form of the invention, including a base and an adjustable member pivoted thereto, except that it includes cylindrical magnet inserts 228 shielded by cup-like insert liners 230 made of a nonmagnetic material that are mounted so as to create a magnetic field at both the bottom edge wall 232 and the rear work holder jaw-contacting side wall 234 of the base body 235. This is effected by disposing some of the magnet inserts 228 and their associated insert liners 230 in recesses 236 which open to the rear side wall 234, and disposing the other associated magnet inserts 228 and insert liners 230 in recesses 238 which open through the bottom edge wall 232. Therefore, the base body 235 may be associated with a work holder so as to have either or both its side wall 234 and its bottom wall 232 adhere to the work holder jaw and the work table surface, respectively. It is contemplated that normally both of the walls will adhere. In other respects, the FIGS. 12–14 form is similar to the FIGS. 9–11 form. It includes an adjustable member 240 in the form of a flat bar having a lateral protuberance 242 that is received in a cut-away notch 244 formed in the base body 235 and selectively adjustably secured to the base body 235 by the tapered socket head screw 246, which cooperates with the tapered plain opening 248 formed in the protuberance 242 and the threaded opening 250 formed in the base body 235. The FIGS. 12–14 form of the invention is otherwise operable in the same general manner as the FIGS. 9–11 form.

In FIG. 15 there is illustrated a base 252 which may be substituted for the base of the FIGS. 12–14 form of the invention. Adjustable work-locating assemblies which include the FIG. 15 type of base, are utilized in pairs to position a piece of work, as illustrated in FIGS. 32 and 33. The base 252 comprises a body 254 made of a magnetic material, such as steel or the like, wherein is formed a plurality of recesses 256, in each of which is disposed a magnet insert 258 and a cup-like insert liner 260 made of a nonmagnetic material. All of the recesses 256 are disposed so as to open at the bottom edge wall 262 of the base body 252. Extending horizontally through the base body 252 is an opening 264, which is precision reamed or ground.

In the FIGS. 12–14 and FIG. 15 form of the invention, the base bodies have been disclosed as made of a magnetic material and shielded from the magnet inserts by nonmagnetic insert liners. However, if desired, the base bodies may be made of a nonmagnetic material, the insert liners dispensed with, and the magnet inserts 258 pressed directly into the recesses in the base bodies.

Work-locating means which include bases of the FIG. 15 type are utilized in pairs, as illustrated in FIGS. 32 and 33. When operatively associated, their bottom edge walls rest on the upper surface 266 of the work table 268 and firmly adhere thereto as a result of the magnetic action of the magnet inserts 258. The work holder includes a stationary jaw 270 and a relatively movable jaw 272 having selectively operated moving means 274 of known construction associated therewith. A pair of work-locating means which includes the FIG. 15 type of base is disposed between the jaws 270 and 272 and is properly aligned and spaced by an elongated round bar 276 which is received in the openings 264 in the bases 252, as can be seen in FIG. 32. Set screws 278 are tightened in threaded openings 280, which are formed in the base bodies, to lock the bar 276. Each of the locating means has its adjustable member 282 angularly adjusted relative to the base 252 so as to provide the desired lateral angle of inclination for the piece of work W illustrated in FIGS. 32 and 33, which is then rigidly clamped in position by the work holder jaws 270 and 272. It is contemplated that sets of bars 276 of different lengths will be provided with pairs of work-locating means including bases of the FIG. 15 type.

In view of the foregoing it will be apparent that I have provided a number of different forms and modifications of my invention, and that each and every one of the objects of this invention has been satisfied.

As will be evident from the foregoing description, certain aspects of my invention are not limited to the particular details of construction of the examples illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. For use with a work holder having a pair of relatively longitudinally movable work-contacting jaws that are arranged to contact and clamp work disposed therebetween, means for locating work laterally between the jaws comprising: a body; said body having a flat bottom wall for contacting the work holder work table surface; magnetic means for securing said body in the work holder; and a laterally facing means for contacting and laterally positioning the work pivotally secured to said body; said magnetic means being arranged in said body so as to be operative through a planar portion thereof and contact one of the jaws, and said body being dimensioned relative to the work so as to be out of contact with the other jaw when the locating means is operatively used with the work holder to locate and clamp the work.

2. The combination defined in claim 1 wherein said locating means includes angle measurement indicating means.

3. Means for locating work in a work holder having a pair of longitudinally movable work-contacting jaws comprising: a base having a flat bottom wall for contacting a work holder bed; a member selectively pivotally adjustably secured to said base; magnetic means for securing said base relative to the work holder by magnetically securing one planar side of said base to one of the jaws; and a work-contacting surface on said member.

4. The invention defined in claim 3 which further includes means for measuring and indicating the angle at which said work-contacting surface extends.

References Cited in the file of this patent

UNITED STATES PATENTS

| | | |
|---|---|---|
| 1,335,247 | Lask | Mar. 30, 1920 |
| 2,113,874 | Chanik | Apr. 12, 1938 |
| 2,666,352 | Philips | Jan. 19, 1954 |
| 2,827,706 | Fuller | Mar. 25, 1958 |
| 2,923,865 | Brandenburg | Feb. 2, 1960 |